United States Patent [19]

You

[11] 4,444,167
[45] Apr. 24, 1984

[54] AIR VALVE DEVICE FOR AN INTERNAL COMBUSTION ENGINE

[76] Inventor: Won F. You, 3rd Fl., 162, Fu Hsing S. Rd., Sec. 1, Taipei, Taiwan

[21] Appl. No.: 376,817

[22] Filed: May 10, 1982

[51] Int. Cl.³ ............................................. F02M 23/06
[52] U.S. Cl. ...................................... 123/327; 123/586
[58] Field of Search ....................... 123/327, 585–587, 123/32 C, 588, 589

[56] References Cited

U.S. PATENT DOCUMENTS

| | | | |
|---|---|---|---|
| 4,178,890 | 12/1979 | Yamabe et al. | 123/327 |
| 4,240,145 | 12/1980 | Yamo et al. | 123/587 |
| 4,321,900 | 3/1982 | Takeda | 123/327 |
| 4,385,603 | 5/1983 | Bonse et al. | 123/339 |

*Primary Examiner*—William A. Cuchlinski, Jr.
*Attorney, Agent, or Firm*—Karl W. Flocks; Sheridan Neimark; A. Fred Starobin

[57] ABSTRACT

A gasoline engine air valve fuel saver device, characterized in the ability to have the air valve opened automatically in circumstances where the vehicle concerned is reducing its speed, going downhill or the suction from within the carburetor is great while the engine rotation speed remains higher than 920 RPM (equivalent to the speed of 25 Kms per hour as effected by the high-speed gear shifting), so that the air may bypass the carburetor at it passes from the air filter to the intake manifold to reach the cylinders, so as to reduce the vacuum in the intake manifold and so reduce the quantity of gasoline that will enter the cylinders, to achieve a saving of fuel consumption and abatement of air pollution as well.

7 Claims, 2 Drawing Figures

AIR VALVE DEVICE FOR AN INTERNAL COMBUSTION ENGINE

SUMMARY OF THE INVENTION

The present invention relates to an air valve device for an internal combustion engine.

It is common knowledge that while going downhill, reducing from a higher speed to a lower speed, or braking, the vehicle using gasoline as fuel will generally have to be released or loosened of its accelerator, and even if the throttle valve in the carburetor is at a minimal position, engine rotation is affected by reverse transmission by virtue of rear wheel traction. As a result thereof the engine will generate a vacuum, that is greater than is the case with idle engine conditions, underneath the throttle valve, which will suck huge amounts of gasoline from the nozzle of the low-speed fuel network into the cylinders and thereby cause an over-concentrated proportion of gas mixture which will consequently give rise to an incomplete combustion of the fuel. The situation could be even worse so that fuel combustion keeps going on in the exhaust pipe. Thus it will not only cause a waste of energy, but also endanger human health conditions with aggravated air pollution.

A prevalent fuel saving method is to reduce the size of the fuel nozzle for the purpose of reducing unit fuel ejections, ignoring the fact that it is fundamentally important to maintain the gas mixture at a prescribed ratio. A diluted gas mixture will incur improper combustion, so degrading acceleration performance or bringing about engine shocks or explosions and other engine troubles, thus putting the driver concerned in a precarious driving condition, besides shortening service life of engine and the vehicle at large.

To save fuel, some drivers let their cars glide along in a neutral gear shifting position while going downhill or travelling at high speeds, which is extremely dangerous in case of deviation of centre of gravity or other emergency incidents, in as much as a vehicle is travelling out of engine control and disengaged from braking mechanisms. (Traffic codes in most countries forbid travelling in a neutral gear shift position downhill).

In accordance with the present invention there is provided an air valve device for an engine having an air intake with a fuel injection means, the air intake providing an air fuel mixture to an inlet manifold, wherein the air valve device provides at least two alternative air intake channels which bypass the fuel injection means, such that the air flow through at least one alternative air intake channel is controlled by a first valve means which will permit the passage of air when the pressure within the intake manifold falls below a preset limit, and such that the air flow through at least one other alternative air intake channel is controlled by a second valve means, which will permit the passage of air when the signal from a tachometer indicates that the engine speed is greater than a preset limit.

Preferably the first valve means is a one-way pressure relief valve, and the second valve means is a solenoid operated valve.

Preferably the engine has an accelerator mechanism, attached to which is a magnet, and also wherein the signal from the tachometer is fed to the solenoid operated valve via a reed switch, such that the magnet is positioned near enough the reed switch to close the same only when the accelerator mechanism is set in an idle position.

The tachometer may comprise at least a rectifying stage, an integrating stage and a plurality of amplifying stages, such that when a signal is input to the tachometer it is rectified by the rectifying stage prior to being integrated by the integrating stage, and the overall gain of the amplifying stages is such that the output current from the tachometer is large enough to operate the second valve means when the rotational speed of the engine exceeds 920 revolutions per minute.

The reed switch and the magnet are coupled to each other by magnetic field effects so that whilst the accelerator is set loose the magenet will be adjacent the reed switch owing to the action of the backpull spring as provided on the accelerator, thereupon both ends of the reed switch will connect together.

In vehicles with engines equipped as above the air valve is opened automatically, in circumstances where the vehicle provided with such a device is reducing its speed, going downhill or the suction from within the carburetor is enormous whilst the engine rotation speed remains higher than 920 RPM, so that the air will go via an air filter and the intake manifold to reach the cylinders so as to help reduce superfluous gasoline from entering the cylinder, so as to attain the objective of saved use of fuel without affecting driving power or occasioning shock, explosive effects, shortage of fuel supply or any other bad effects whatever.

The solenoid operated valve is provided as an fuel saver device, that serves to reduce the fuel output from the carburetor by regulating air passage into the intake manifold, whereas the pressure relief valve is meant to open once the cylinder suction force exceeds the spring tension, so as to facilitate passing of the air from the air filter into the cylinder, thus achieving fuel saving objectives.

DETAILED DESCRIPTION

Figure 1:
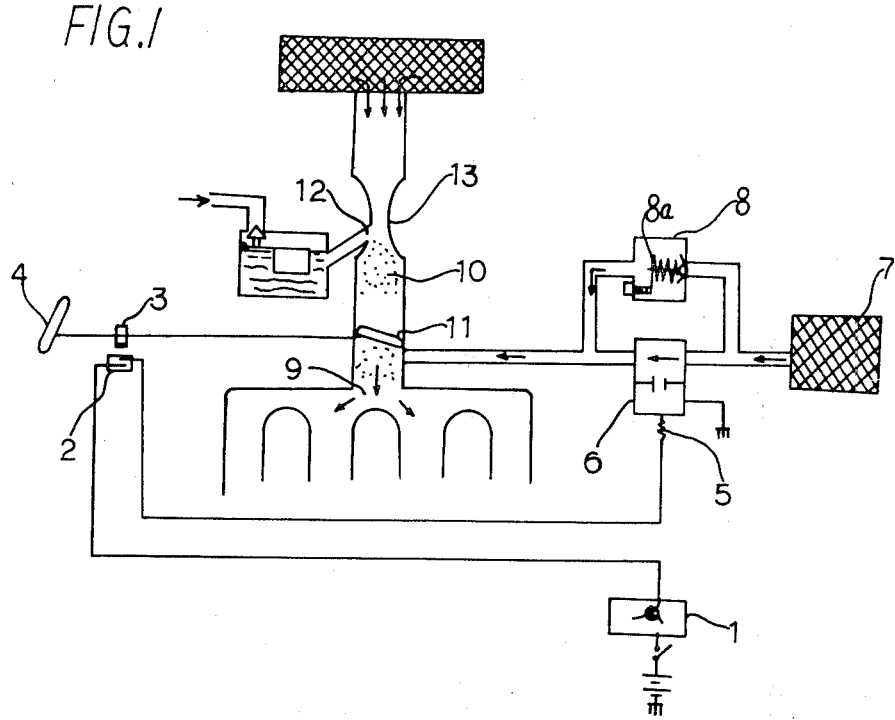
FIG. 1 is a schematic diagram of the present invention.

As shown in the accompanying drawings, the constituent elements of the subject invention include; a tachometer 1, reed switch 2, magnet 3, accelerator pedal 4, solenoid coil 5, solenoid operated valve 6, air filter 7, pressure relief valve 8, intake manifold 9, carburetor 10, throttle valve 11, fuel nozzle 12, and venturi throat 13.

Whenever the engine speed exceeds 920 RPM, the power output of tachometer 1 will be directly fed out to reed switch 2 which will conduct because of interactive magnetic induction with magnet 3, current thus transmitted will drive a solenoid coil 5 to open the solenoid operated valve 6, by then the vacuum suction from the intake manifold 9 will become greater than 21" mm Hg, to the effect that masses of air from air filter 7 will enter the cylinders via intake manifold 9 by way of the solenoid operated valve 6. This process will serve to reduce the suction to the carburetor 10 and that will in turn greatly reduce the fuel ejected from the fuel nozzle 12 thereby achieving the objective of fuel savings.

Figure 2:
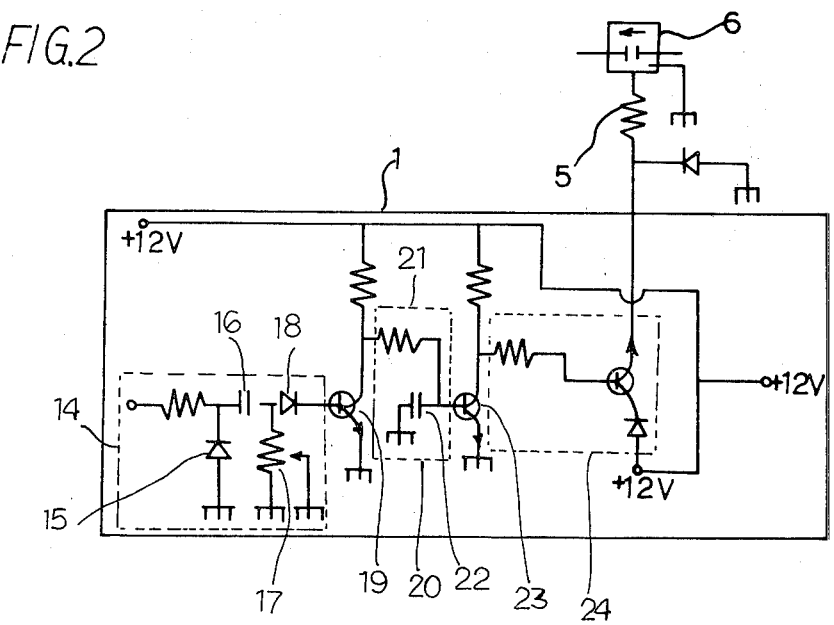
FIG. 2 is a circuit diagram of the tachometer of FIG. 1.

The tachometer, as shown in FIG. 2, is supplied with power from the 12 V power circuit of the vehicle. The electrical input to the tachometer which will consist of a series of positive and negative pulses is fed to the input stage 14 consisting of two diodes, one capacitor, one resistor and one potentiometer. These are interconnected as shown, diode 15 rectifying the input, capacitor 16 providing D.C. isolation between the input and the tachometer circuit, potentiometer 17 providing a variable attenuation of the input signal, and diode 18 rectifying the signal from capacitor 16 and thus feeding only positive pulses into the first transistor 19. First transistor 19 is connected in a common emitter mode to amplify these pulses, which are then fed to integrating stage 20.

Integrating stage 20 consists of a resistor 21 and a capacitor 22 which is grounded on the non-signal side. The effect of this integrating stage 20 is to produce an output signal which is fairly constant, and with a magnitude approximately proportional to the rate at which pulses are fed to it.

The output signal from integrating stage 20 is then fed to the base of transistor 23 which is also connected in a common emitter mode to amplify the integrated signal. This amplified signal is then fed to an emitter follower stage 24 which boosts the current of the signal. If the input to the tachometer consists of more than 920 pulses per minute then the current from the emitter follower stage 24 will be large enough to energise coil 5 to operate valve 6.

Now, should the speed of engine rotation go below 920 RPM, then the tachometer 1 will react instantly to have the power to the solenoid operated valve cut out so that the air from the air filter 7 shall not enter the cylinders so that the gas mixture at low speed will remain at required proportion rate to preclude flameouts.

When the vehicle is intended to increase travel speed and the accelerator pedal 4 is stepped upon accordingly, it will serve to separate the reed switch 2 from the magnet 3 thus opening the reed switch 2, so that current will not be in a position to flow to the solenoid operated valve 6, thus checking the air in the air filter 7 from entering the cylinder. Fuel output from the fuel nozzle 12 will be stepped up, therefore a stable running will be secured for the engine without affecting power output from the engine, thus achieving the objective of fuel savings.

Still another instance of the fuel saving feature as covered hereunder is that in circumstances where the vehicle concerned is obliged to reduce speed or suddenly comes to downhill road conditions while travelling at high speed as the engine is involved, since that in these cases the vacuum suction in the intake manifold 9 are well in excess of 21.5 mm Hg, the proportion rate of the gas mixture in the venturi throat 13 being overconcentrated to result in a suction that is greater than the force due to spring 8a that is part of the pressure relief valve 8. Therefore the pressure relief valve 8 will be drawn open to permit the passage of the air from the air filter, and finally the air will enter the cylinders by way of the intake manifold 9 accordingly helping to reduce the fuel to be ejected out from the fuel nozzle 12, thus achieving the objective of fuel saving all the same.

A reduction in travelling speed will likewise serve to hold down the vacuum suction due to venturi throat 13, whereupon the spring 8a as incorporated to the pressure relief valve 8 will resume a closed state and the fuel nozzle will resume a normal fuel supply activity.

The present invention titled Gasoline Engine Air Valve Fuel Saver Device has been subjected to tests under various simulated applicatory conditions and found capable of saving around 8%–18% of fuel oils under regular travelling speeds and free from adverse results such as weakened power drive, shockings, unmanageability downhill regardless of particular driving habits of the drivers. Any feasible way to save energy resources is unquestionably of prime concern to all parties and individuals worldwide, fuel consumption in land vehicles is astonishingly high nowadays, an invention such as the present one, meant to save oil consumption in land transport vehicles, will help a good deal in saving oil conservations for any civilized nation in the world.

I claim:

1. An air valve device for an internal combustion engine which has a fuel supply with an air intake providing an air fuel mixture to an inlet of the engine, the air valve device comprising
   at least first and second alternative air intake channels in a parallel relationship to each other which by-pass the fuel supply and supply air directly to the inlet of the engine,
   first valve means to control air flow through said first air intake channel, allowing air flow through said first air intake channel, allowing air flow through said first channel when the pressure at the inlet of the engine falls below a preset limit,
   second valve means to control air flow through said second air intake channel,
   tachometer means to indicate the speed of the engine, connected to said second valve means to permit the passage of air through said second air intake channel when the speed of the engine is greater than a preset limit,
   said tachometer means including
   a rectifying stage, an integrating stage, and amplifying stages electrically interconnected to rectify and then integrate a signal input to said tachometer means and amplify the signal to an overall gain in said amplifying stages such that the output current from said tachometer means is large enough to operate said second valve means when the rotational speed of the engine exceeds 920 revolutions per minute.

2. The air valve device of claim 1 wherein said first valve means is a one-way pressure relief-valve, and said second valve means is a solenoid operated valve.

3. The air valve device of claim 2 wherein
   a conversion kit for attachment to the internal combustion engine as an integrated part of the existent fuel system which includes
   said first and second valve means and said tachometer means.

4. The air valve device of claim 3 wherein
   said tachometer means includes
   three NPN transistors which feed a signal to said second valve means upon receiving an input indicating rotational speed of the engine exceeding 920 RPM to allow direct air flow to the inlet of the engine.

5. The air valve of claim 2 wherein
   said first valve means is spring-biased closed and will open when suction due to low pressure at the inlet of the engine is such as to overcome spring-bias pressure.

6. The air valve device of claim 1 or 2 wherein
   the engine has an accelerator mechanism attached thereto,
   a magnet is attached to said accelerator mechanism, a reed switch positioned near enough to said magnet to be closed by said magnet only when said accelerator mechanism is in an idle position, said reed switch in the electrical line connection between said tachometer means and said second valve means to allow in the reed switch closed position the feeding of a signal from said tachometer means to said second valve means.

7. The air valve device of claim 6 wherein
said accelerator mechanism is spring biased to locate said magnet centered in relation to said reed switch when applied pressure is removed from said accelerator mechanism.

* * * * *